No. 790,452. PATENTED MAY 23, 1905.
F. NENZEL.
METALLIC PACKING.
APPLICATION FILED DEC. 24, 1904.

Witnesses
C. W. Miles.
C. A. McCormack.

Inventor
Fredrick Nenzel
By Walter F. Murray
Attorney

No. 790,452.

Patented May 23, 1905.

UNITED STATES PATENT OFFICE.

FREDRICK NENZEL, OF CINCINNATI, OHIO.

METALLIC PACKING.

SPECIFICATION forming part of Letters Patent No. 790,452, dated May 23, 1905.

Application filed December 24, 1904. Serial No. 238,270.

*To all whom it may concern:*

Be it known that I, FREDRICK NENZEL, a citizen of the United States of America, and a resident of Cincinnati, county of Hamilton, State of Ohio, have invented certain new and useful Improvements in Metallic Packing, of which the following is a specification.

The object of my invention is a metallic packing for use with piston-rods, valve-stems, &c., which will form a tight fit about the same, so as to prevent the escape of steam, ammonia, compressed air, or gasolene, &c., and will at the same time cause a minimum amount of friction and wear upon said rods and valve-stems. This object is attained by the means illustrated in the accompanying drawings, in which—

Figure 1:
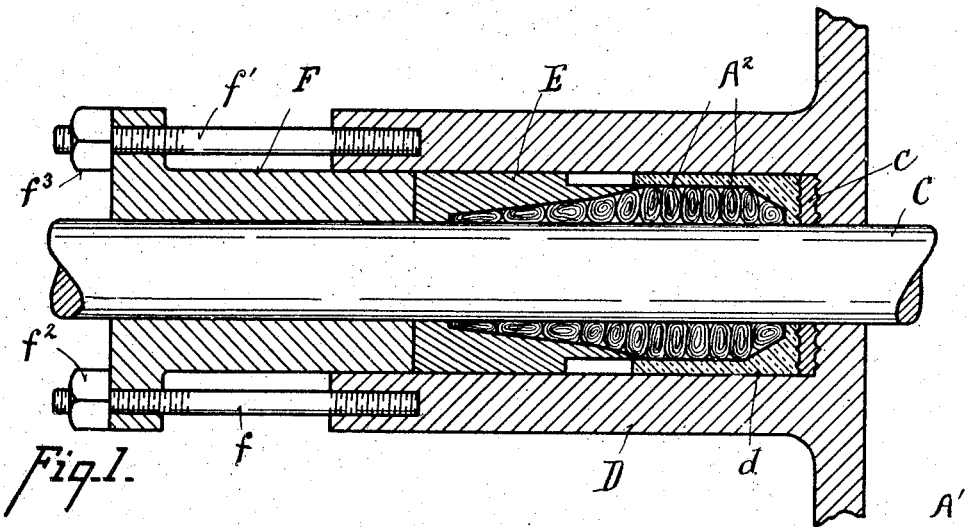
Figure 2:
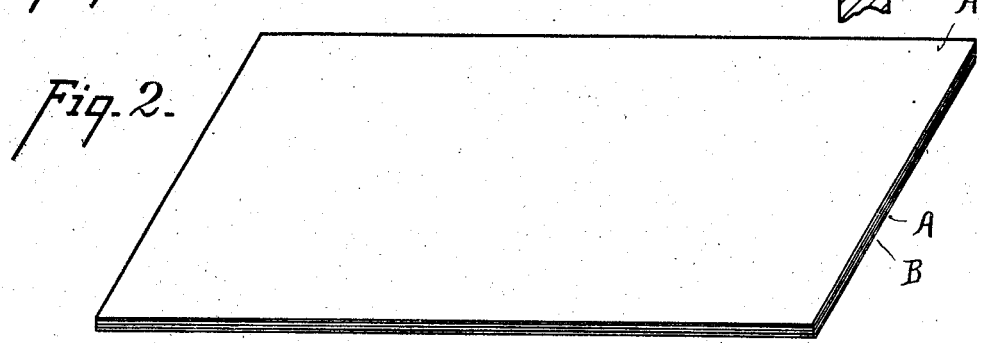
Figure 3:
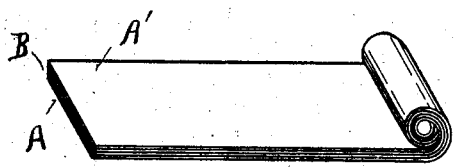
Figure 4:
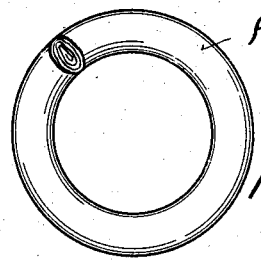

Figure 1 is a sectional view of the packing-gland of a piston-rod supplied with the metallic packing embodying my invention. Fig. 2 is a perspective view of the layers of material used to form my metallic packing. Fig. 3 is a perspective view showing the next step in the formation of my packing. Fig. 4 is a plan view of the packing as rolled up and ready to be inserted in the gland.

Referring to the parts: In preparing my metallic packing I take first a sheet of metal foil A, preferably tin-foil, and spread over it a layer of oil mixed with some binding material, such as powdered graphite. Then on this layer of oil and graphite I lay another sheet A' of metal foil. Then upon top of this second sheet I place a second layer of oil and powdered graphite. Then upon this layer of graphite and oil I place another sheet of metal foil, and so on, alternately, first a sheet of metal foil and then a layer of powdered graphite and oil until I secure the proper thickness. Then I roll up the layers of foil, oil, and graphite thus prepared, as shown in Fig. 3, into an elongated cylinder or roll, which I then curl into a ring or spiral $A^2$, as shown in Fig. 4. A series of these rings or rolls $A^2$ of packing are then placed about the shaft or stem C within the gland D. In the particular form of packing-gland shown in Fig. 1 there is a washer $c$, surrounding the rod C, and a cup $d$, within which my packing is placed. After the layers of packing have been placed in the cup $d$, surrounding the rod C, the same is compressed by means of the flanged nut E, gland F, and bolts and nuts $f$, $f'$, $f^2$, and $f^3$. My metallic packing so prepared is flexible, so that when thus compressed it fits snugly against the rod and adjusts itself readily to any roughness on the surface of the rod no matter how small this roughness may be. The packing thus adjusting itself to any irregularities in the rod makes a very tight fit, but at the same time allows the movement of the rod through the packing with a minimum amount of friction. The intermingling of the graphite and oil with the metal keeps the same flexible and also supplies a small amount of oil at all times to reduce the friction and wear between the packing and the rod.

What I claim is—

1. A metallic packing consisting of foil intermixed with oil and a binding material for the oil.

2. A metallic packing consisting of successive layers of metal foil and of oil and a binding material therefor.

3. A metallic packing consisting of successive layers of tin-foil, of oil and a binding material therefor.

4. A metallic packing consisting of successive layers of tin-foil, of graphite and oil.

FREDRICK NENZEL.

Witnesses:
 WALTER F. MURRAY,
 A. McCORMACK.